(12) United States Patent
Shim et al.

(10) Patent No.: US 12,472,669 B2
(45) Date of Patent: Nov. 18, 2025

(54) INJECTION MOLD

(71) Applicant: LG CHEM, LTD., Seoul (KR)

(72) Inventors: Dong Chul Shim, Daejeon (KR); Jung Chul Shin, Daejeon (KR); Byeong Joon Jeong, Daejeon (KR); Worl Yong Kim, Daejeon (KR); Joon Hyoung Park, Daejeon (KR); Jae Hyun Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 136 days.

(21) Appl. No.: 18/024,705

(22) PCT Filed: Mar. 7, 2022

(86) PCT No.: PCT/KR2022/003202
§ 371 (c)(1),
(2) Date: Mar. 3, 2023

(87) PCT Pub. No.: WO2022/191548
PCT Pub. Date: Sep. 15, 2022

(65) Prior Publication Data
US 2023/0339161 A1  Oct. 26, 2023

(30) Foreign Application Priority Data
Mar. 9, 2021 (KR) .................. 10-2021-0031020

(51) Int. Cl.
*B29C 45/37* (2006.01)
*B29C 33/38* (2006.01)
(Continued)

(52) U.S. Cl.
CPC ........ *B29C 45/372* (2013.01); *B29C 33/3842* (2013.01); *B29C 33/424* (2013.01);
(Continued)

(58) Field of Classification Search
CPC . B29C 45/263; B29C 45/2632; B29C 45/372; B29C 45/374; B29C 45/345; B29C 45/7331; B29K 2905/00
See application file for complete search history.

(56) References Cited

U.S. PATENT DOCUMENTS 5,439,622 A * 8/1995 Pennisi ................. B29C 33/565
264/129
2005/0105190 A1 5/2005 Chao et al.
(Continued)

FOREIGN PATENT DOCUMENTS

JP  H06-64005 A  3/1994
JP  H07-032426 A  2/1995
(Continued)

OTHER PUBLICATIONS

"Makoto Kawamura et al., Properties and Examples of the New Porous Metal Die Material, Porcerax II", Denki-Seiko, 1993, , vol. 64, No. 3, pp. 210-218.
(Continued)

*Primary Examiner* — Jerzi H Moreno Hernandez
(74) *Attorney, Agent, or Firm* — Morgan, Lewis & Bockius LLP (57) ABSTRACT

An injection mold, processes for use thereof and products therefrom. The injection mold can include: a transfer mold, which is disposed in front of the injection-molded product and forms a pattern on a front surface of the injection-molded product; and a rear surface mold, which is disposed behind the injection-molded product. A rear surface part of the rear surface mold, which faces a rear surface of the injection-molded product, includes a heat dissipating metal. The heat dissipating metal includes a PORCERAX® material. An embossing pattern is formed on a front surface part of the transfer mold, which faces the front surface of the
(Continued)

injection-molded product, so that the pattern is formed on the front surface of the injection-molded product.

10 Claims, 6 Drawing Sheets

(51) Int. Cl.
*B29C 33/42* (2006.01)
*B29C 45/00* (2006.01)
*B29C 45/34* (2006.01)
*B29C 45/73* (2006.01)

(52) U.S. Cl.
CPC ........ *B29C 45/345* (2013.01); *B29C 45/7331* (2013.01); *B29C 45/0001* (2013.01); *B29K 2905/00* (2013.01)

(56) References Cited

U.S. PATENT DOCUMENTS

| | | | |
|---|---|---|---|
| 2005/0189665 | A1 | 9/2005 | Nishigaki |
| 2008/0054049 | A1* | 3/2008 | Cowelchuk ............. B29C 45/34 228/101 |
| 2017/0050399 | A1* | 2/2017 | Sakai ..................... B29C 45/26 |
| 2023/0321879 | A1* | 10/2023 | Shim ..................... B29C 45/372 425/542 |

FOREIGN PATENT DOCUMENTS

| | | | |
|---|---|---|---|
| JP | H11-277586 | A | 10/1999 |
| JP | 2000-280304 | A | 10/2000 |
| JP | 2002-113751 | A | 4/2002 |
| JP | 2005-145048 | A | 6/2005 |
| JP | 2005-238456 | A | 9/2005 |
| JP | 2006-044247 | A | 2/2006 |
| JP | 2007-283714 | A | 11/2007 |
| JP | 2010-158881 | A | 7/2010 |
| JP | 5176618 | B2 | 4/2013 |
| JP | 2017-071534 | A | 4/2017 |
| JP | 2017-159524 | A | 9/2017 |
| JP | 2018-030231 | A | 3/2018 |
| JP | 2020-121409 | A | 8/2020 |
| KR | 10-0493742 | B1 | 6/2005 |
| KR | 10-0747406 | B1 | 8/2007 |
| KR | 10-1282250 | B1 | 7/2013 |
| KR | 10-1409438 | B1 | 6/2014 |
| KR | 10-1557222 | B1 | 10/2015 |
| KR | 10-2016-0134163 | A | 11/2016 |
| KR | 10-2011905 | B1 | 8/2019 |
| KR | 10-2189820 | B1 | 12/2020 |
| WO | WO-2009122862 | A1 * | 10/2009 ............. B29C 45/40 |
| WO | 2018/216367 | A1 | 11/2018 |

OTHER PUBLICATIONS

"The Hole Story", European Plastics News, Emap Business Publication, London, GB, vol. 24, No. 5, May 1, 1997 (May 1, 1997), XP000656936.

Anonymous: "Introducing Porcerax", May 9, 2016 (May 9, 2016), XP93126601.

Extended European Search Report issued in European patent application 22767444.7 dated Feb. 13, 2024.

International Search Report (with partial translation) and Written Opinion not in English.

* cited by examiner

INJECTION MOLD

CROSS-REFERENCE TO RELATED APPLICATION

The present application claims the benefit of the priority of Korean Patent Application No. 10-2021-0031020, filed on Mar. 9, 2021, which is hereby incorporated by reference in its entirety.

TECHNICAL FIELD

The present invention relates to an injection mold.

BACKGROUND ART

Injection molding is a process for molding an injection-molded product by injecting, into an injection mold, a material to be injection-molded, which is melted by applying heat.

Many parts of vehicles and electronic products have been manufactured by injection molding, and parts having various exterior designs have been provided by using patterns engraved in an injection mold. A design demanded by exterior parts may be a glossy surface (specular surface), but there has been a gradual increase in selection of micro-embossing patterns in order to give an aesthetical function such as textures, and give surface properties such as scratch and stain resistance. However, there is a phenomenon in which the micro-embossing patterns are not uniformly transferred during the injection molding, depending on the structure of the mold, and the resulting gloss difference leads to the frequent occurrence of a phenomenon in which the exterior surface of the molded article is unevenly reflected. Injection-molded products, on which typical embossing patterns are engraved, are generally applied without post processing such as coating/plating, and concealment by the post processing is impossible. Thus, the aesthetical problem with the surfaces becoming dappled is a serious problem, which needs to be urgently solved.

[Prior art document] (Patent document) Korean Patent Registration No. 10-2189820

DISCLOSURE OF THE INVENTION

Technical Problem

One aspect of the present invention is to provide an injection mold capable of implementing uniform transfer onto an injection-molded product.

Technical Solution

The injection mold according to an embodiment of the present invention is an injection mold for manufacturing an injection-molded product through injection molding, comprising: a transfer mold, which is disposed in front of the injection-molded product and forms a pattern on a front surface of the injection-molded product; and a rear surface mold which is disposed behind the injection-molded product. A rear surface part of the rear surface mold, which faces a rear surface of the injection-molded product, may comprise a heat dissipating metal.

In addition, an injection-molded product according to an embodiment of the present invention may be manufactured by the injection mold according to an embodiment of the present invention.

Advantageous Effects

According to the present invention, the rear surface part of the rear surface mold, which faces the rear surface of the injection-molded product, may be made of the heat dissipating metal to realize the effects of achieving the uniform transfer and preventing the outer appearance of the injection-molded product from being deteriorated when the transfer mold forms the pattern on the front surface of the injection-molded product.

MODE FOR CARRYING OUT THE INVENTION

The purpose, specified advantages, and novel features of the present invention will be clarified through following embodiments described with reference to the accompanying drawings. Note that the same or similar components in the drawings are designated by the same reference numerals as far as possible even if they are shown in different drawings. The present invention may be embodied in different forms and should not be construed as limited by the embodiments set forth herein. Moreover, in the following description of the present invention, the detailed descriptions of the related well-known art, which may unnecessarily obscure subject matters of the present invention, will be ruled out.

Injection Mold According to Embodiment

Figure 1:
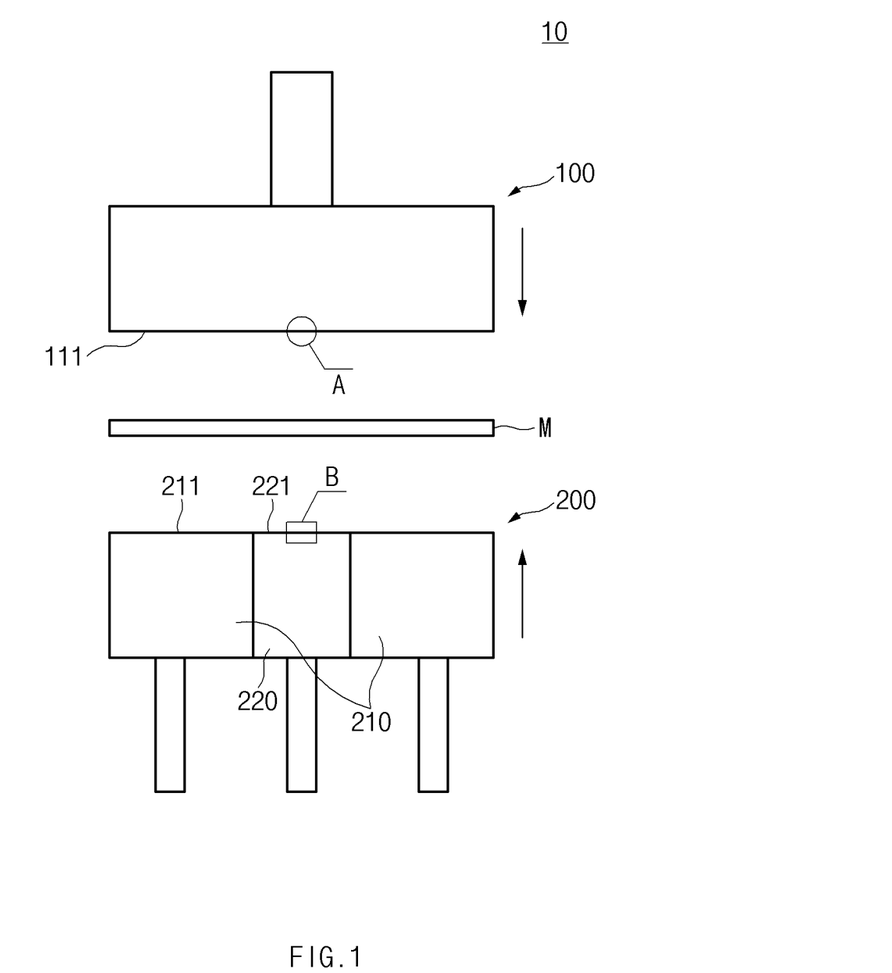
FIG. 1 is a cross-sectional view illustrating an injection mold according to an embodiment of the present invention.

FIG. 1 is a cross-sectional view illustrating an injection mold according to an embodiment of the present invention.

Referring to FIG. 1, an injection mold 10 according to an embodiment of the present invention is an injection mold for manufacturing an injection-molded product M through injection molding, comprising a transfer mold 100, which forms a pattern on a front surface of the injection-molded product M, and a rear surface mold 200, which is disposed behind the injection-molded product M. Each of rear surface parts 211 and 221 of the rear surface mold 200, which face a rear surface of the injection-molded product M, comprises a heat dissipating metal.

Figure 2:
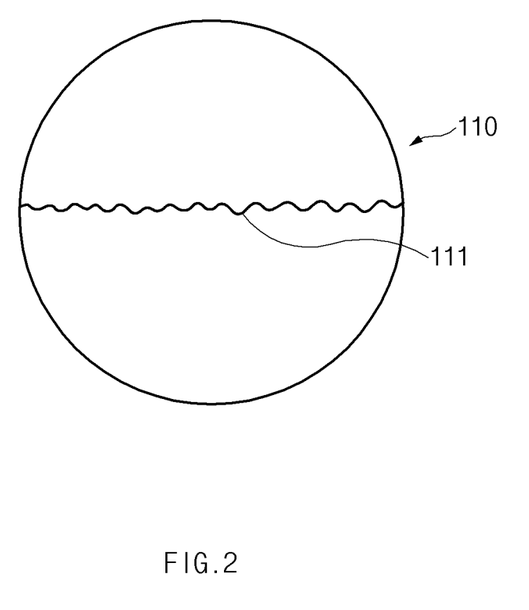
FIG. 2 is an enlarged cross-sectional view illustrating an area A in FIG. 1.

FIG. 2 is an enlarged cross-sectional view illustrating an area A in FIG. 1.

In more detail, referring to FIGS. 1 and 2, the transfer mold 100 may be disposed in front of the injection-molded product M to form the pattern on the front surface of the injection-molded product M. Here, the front surface of the injection-molded product M means a surface on a front side of the injection-molded product M. Referring to FIG. 1, the front surface may be a surface on an upper side of the injection-molded product M.

In addition, the pattern may be formed on a front surface part 111 of the transfer mold 100, which faces the front surface of the injection-molded product M, so that the pattern is transferred onto the injection-molded product. An embossing pattern may be formed on the front surface part 111 of the transfer mold 100. Here, the front surface part 111 of the transfer mold 100 may be processed by chemical etching to have roughness on a surface thereof.

For example, the embossing pattern, which is formed on the front surface part 111 of the transfer mold 100, may have a roughness Ra of, for example, 50 µm or less. Specifically, for example, the roughness Ra of the embossing pattern, which is formed on the front surface part 111, may be 5.8 µm to 30 µm. More specifically, for example, the roughness Ra of the embossing pattern, which is formed on the front surface part 111, may be 10 µm.

Referring to FIG. 1, the rear surface mold 200 may be disposed behind the injection-molded product M to support the rear surface of the injection-molded product M. Here, the rear surface of the injection-molded product M means a surface on a rear side of the injection-molded product M. Referring to FIG. 1, the rear surface may be a surface on a lower side of the injection-molded product M. For example, the rear surface mold 200 may be disposed below the injection-molded product M.

Each of the rear surface parts 211 and 221 of the rear surface mold 200, which face the rear surface of the injection-molded product M, may comprise a heat dissipating metal. The heat dissipating metal may be made of a Porcerax material.

Thus, the injection mold 10 according to an embodiment of the present invention, which is configured as above, has an effect of achieving uniform transfer during injection because each of the rear surface parts 211 and 221 of the rear surface mold 200, which face the injection-molded product M, comprises the heat dissipating metal.

Particularly, in the rear surface mold 200 having a split structure, since each of the rear surface parts 211 and 221 is made of the Porcerax material that is a heat dissipating metal, heat exchange may become faster during the injection. Accordingly, the uniform transfer may be performed so that a sense of difference is not accompanied by the injection-molded product M corresponding to a split mold portion.

Figure 3:
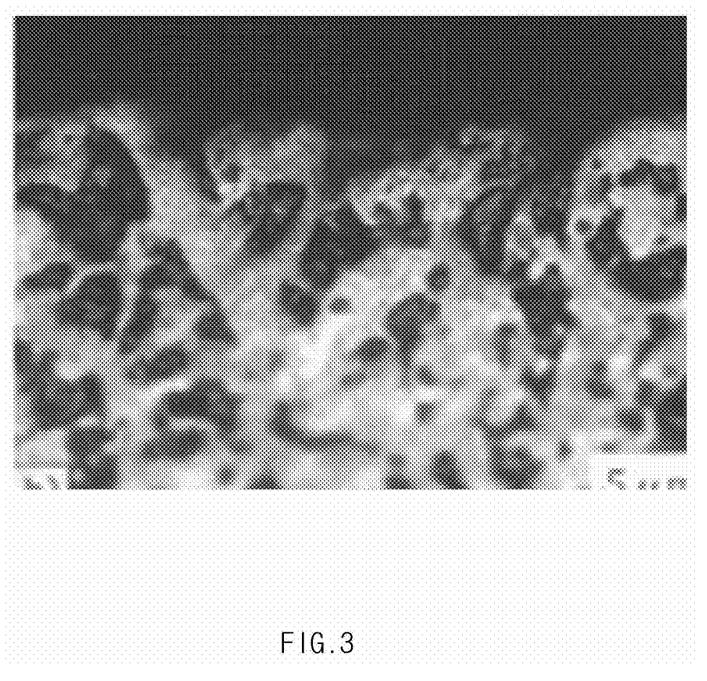
FIG. 3 is an enlarged image showing an example of an area B in FIG. 1.
Figure 4:
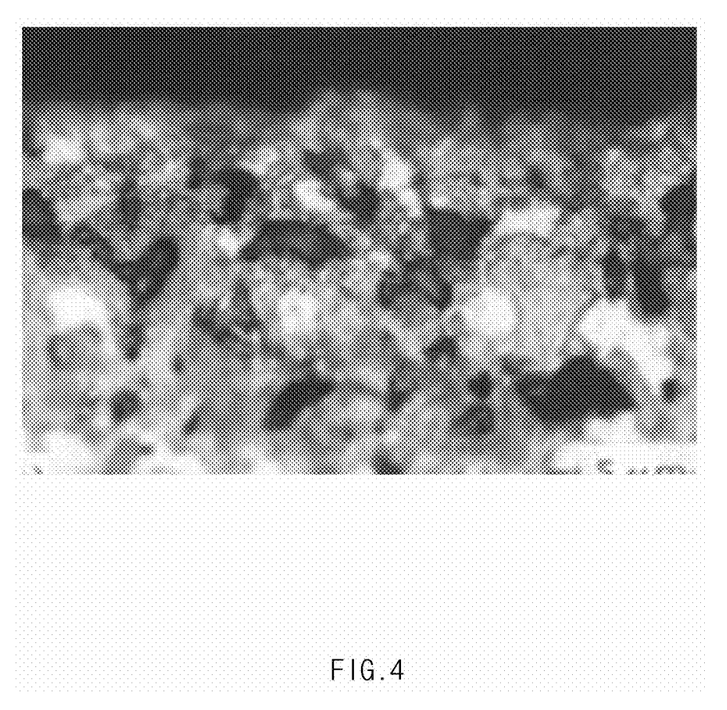
FIG. 4 is an enlarged image showing another example of the area B in FIG. 1.

FIG. 3 is an enlarged image showing an example of an area B in FIG. 1. FIG. 4 is an enlarged image showing another example of the area B in FIG. 1.

Referring to FIG. 3, in an example, the rear surface parts 211 and 221 of the rear surface mold 200 may be processed through the discharging. Each of the rear surface parts 211 and 221 made of the Porcerax material, which are processed through the discharging, may have 20% to 30% of air pores therein. Accordingly, the rear surface parts 211 and 221 of the rear surface mold 200 may have a gas vent function using a vent structure with an air pore shape.

Referring to FIG. 4, in another example, the rear surface parts 211 and 221 of the rear surface mold 200 may be processed by surface milling or polishing after the discharging.

Figure 5:
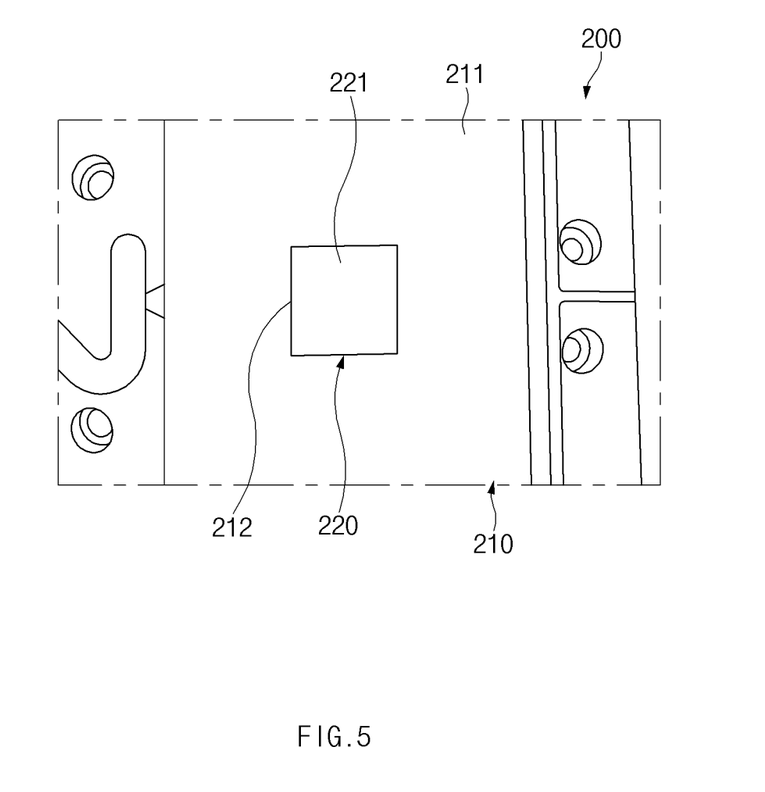
FIG. 5 is a plan view illustrating an example of a rear surface mold in the injection mold according to an embodiment of the present invention.
Figure 6:
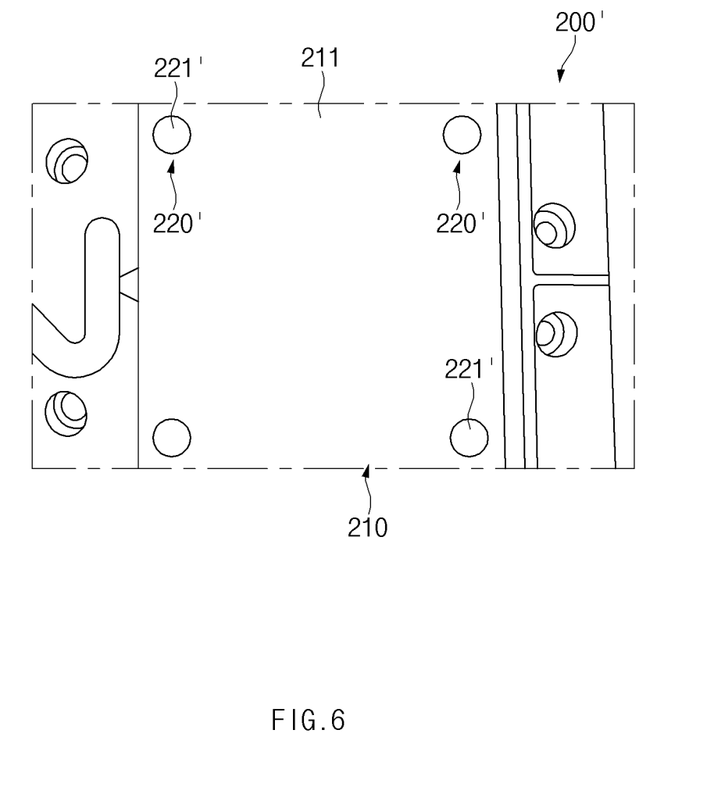
FIG. 6 is a plan view illustrating another example of the rear surface mold in the injection mold according to an embodiment of the present invention.

FIG. 5 is a plan view illustrating an example of a rear surface mold in the injection mold according to an embodiment of the present invention. FIG. 6 is a plan view illustrating another example of the rear surface mold in the injection mold according to an embodiment of the present invention.

Referring to FIGS. 1 and 5, the rear surface mold 200 may be provided in a split type. In an example, the rear surface mold 200 may comprise a first split mold 210, and a second split mold 220 which is disposed at a central portion of the first split mold 210 on a plan view.

Accordingly, the second split mold 220 may move upward relative to the first split mold 210 after the injection, and the injection-molded product M may be easily separated from the rear surface mold 200.

Referring to FIG. 6, in another example, a rear surface mold 200' may comprise a first split mold 210, and a second split mold 220' which is disposed on an edge of the first split mold 210 on a plan view. That is, each of the second split molds 220 and 220' may be disposed at a central portion or an edge of the first split mold 210 (see FIGS. 5 and 6). The edge of the first split mold 210 may be an edge of a portion on which the injection-molded product M is formed in the first split mold 210. Referring to FIG. 5, in an example, a cross-section of the second split mold 220 may be formed in a quadrangle shape. A coupling hole 212 corresponding to the second split mold 220 may be formed in the first split mold 210 so that the second split mold 220 is coupled to the first split mold.

Referring to FIG. 6, in another example, a cross-section of the second split mold 220' may be formed in a circular shape. A rear surface part 221' of the second split mold 220' may be formed in a circular shape on a plan view.

Manufacturing Example 1

Manufactured was an injection mold comprising a transfer mold, which is disposed in front of an injection-molded product to form a pattern on a front surface of the injection-molded product, and a rear surface mold, which is disposed behind the injection-molded product. In addition, the rear surface mold was formed as a mold in a two-part split type, comprising a first split mold, and a second split mold disposed at a central portion of the first split mold on a plan view.

An embossing pattern was formed on a front surface part of the transfer mold, which faces the front surface of the injection-molded product. A chemical etching process was performed so that the embossing pattern, which is formed on the front surface part of the transfer mold, has a roughness Ra of 10 µm.

A rear surface part of the rear surface mold, which faces a rear surface of the injection-molded product, was made of a Porcerax material that is a heat dissipating metal. The rear surface part of the rear surface mold was processed by surface polishing after the discharging.

In addition, an ASA resin was used as a material to be injected.

Manufacturing Example 2

An injection mold was manufactured using the same method as Manufacturing Example 1, except that a rear surface part of a rear surface mold is formed without surface treatment, after the discharging.

Comparative Example 1

An injection mold was manufactured using the same method as Manufacturing Example 1, except that a rear surface part of a rear surface mold is not split, and ordinary mold steel (HP4M) is applied thereto.

Comparative Example 2

An injection mold was manufactured using the same method as Manufacturing Example 1, except that ordinary mold steel (HP4M) is applied to a rear surface part of a rear surface mold.

Comparative Example 3

An injection mold was manufactured using the same method as Manufacturing Example 1, except that a Be—Cu metal material is applied to a rear surface part of a rear surface mold.

Comparative Example 4

An injection mold was manufactured using the same method as Manufacturing Example 1, except that a Telfon (PTFE) material is applied to a rear surface part of a rear surface mold.

Experimental Example 1

Samples for evaluating appearances of the injection-molded products, which were manufactured by Manufacturing Examples 1 and 2 and Comparative Examples 1 to 4, were manufactured under the same molding conditions by applying Ls Mtron LGE-II 220N electric molding machine.

All measurements in the experiment results mean appearance surfaces on top surfaces of the micro-embossed patterned injection-molded products. A change in outer appearance of the top surfaces according to split positions of the rear surface according to a degree of embossing pattern transfer may be observed through naked eyes. In order to quantify characteristics of change in outer appearance of injection-molded products, the degree of transfer was evaluated, and a confocal microscope was used to measure a change in roughness Ra at the positions at which the outer appearance is changed, and a thickness of a line on which the change of the roughness Ra continues. The results of measurements are shown in Table 1 below. (Confocal microscope: Keynence VK-X1100)

TABLE 1

| | Change in roughness on boundary of split component (μm) | Thickness in boundary line (mm) |
|---|---|---|
| Manufacturing Example 1 | 0.1999 | 0.28 |
| Manufacturing Example 2 | 0.228 | 0.33 |
| Comparative Example 1 | −0.048 | 0.5 |
| Comparative Example 2 | 1.595 | 2.55 |
| Comparative Example 3 | 2.502 | 2.1 |
| Comparative Example 4 | −2.912 | 3.89 |

In the difference in embossing pattern on the split positions of the rear surface, the sense of difference due to the different degree in embossing pattern transfer according to the results observed through the naked eyes may be recognized when the change in roughness Ra is ±0.5 μm (5%) or more and when the thickness in boundary line is 2 mm or more. As shown in Table 1, it may be seen that the sense of difference does not occur in Manufacturing Examples 1 and 2, whereas the sense of difference occurs in Comparative Examples 1 to 4. Thus, it is seen that, when the rear surface part of the rear surface mold, which faces the rear surface of the injection-molded product, is made of a Porcerax material that is a heat dissipating metal, uniform transfer is achieved.

Although the present invention has been described with reference to the limited embodiments, the embodiments are merely intended to specifically describe the present invention, and the present invention is not limited thereto. The present invention may be variously implemented by those of ordinary skill in the art within the technical idea of the present invention.

The specific protective scope of the present invention will become apparent from the appended claims.

DESCRIPTION OF THE SYMBOLS

10: Injection mold
100: Transfer mold
111: Front surface part
200, 200': Rear surface mold
211, 221: Rear surface part
212: Coupling hole
220, 220': Second split mold
211, 221, 221': Rear surface part
M: Injection-molded product

The invention claimed is:

1. An injection mold for manufacturing an injection-molded product through injection molding, the injection mold comprising:
    a transfer mold configured to form a pattern on a first surface of the injection-molded product and to be disposed facing the first surface of the injection-molded product; and
    a rear surface mold to be disposed facing a second surface of the injection-molded product, the rear surface mold includes:
        a rear surface part comprising a heat dissipating metal and to face the second surface of the injection-molded product;
        a first split mold including a first rear surface part; and
        a second split mold including a second rear surface part, the second split mold is disposed at a central portion or an edge of the first split mold on a plan view,
    wherein the first rear surface part and the second rear surface part comprise the heat dissipating metal,
    wherein the first rear surface part and the second rear surface part are included in the rear surface part, and are configured to face the second surface of the injection-molded product,
    wherein the second surface of the injection-molded product opposes the first surface of the injection-molded product,
    wherein the heat dissipating metal includes a POR-CERAX® material, which is a metal having a vent structure with air pores, and
    wherein an embossing pattern is disposed on a front surface part of the transfer mold, which faces the first surface of the injection-molded product, so that the pattern is disposed on the first surface of the injection-molded product.

2. The injection mold of claim 1, wherein the rear surface part of the rear surface mold is processed through discharging.

3. The injection mold of claim 2, wherein the rear surface part of the rear surface mold is processed by surface milling or polishing after the discharging.

4. The injection mold of claim 1, wherein the rear surface mold further comprises a coupling hole having a shape corresponding to the second split mold and disposed in the first split mold so that the second split mold is coupled to the first split mold.

5. An injection-molded product manufactured by the injection mold according to claim 1.

6. The injection mold of claim 1, wherein the second split mold is configured to move upward relative to the first split mold.

7. The injection mold of claim 1, wherein the heat dissipating metal is made of the PORCERAX® material.

8. The injection mold of claim 1, wherein the PORCERAX® material is a metal having a vent structure with 20% to 30% of air pores by volume.

9. The injection mold of claim 1, wherein the pattern has a roughness Ra, and a change, X, in the roughness Ra on a boundary of the first split mold and the second split mold satisfies −0.5 µm<X<0.5 µm.

10. The injection mold of claim 1, wherein the second split mold is disposed at the central portion of the first split mold on the plan view, and a cross-section of the second split mold on the plan view is in a form of a quadrangle.

* * * * *